United States Patent [19]

Heublein

[11] 4,305,828

[45] Dec. 15, 1981

[54] METHOD OF INTRODUCING OXYGEN INTO WATER AND CONTAINER FOR THE PERFORMANCE OF SUCH METHOD

[75] Inventor: Walter Heublein, Sempach-Stadt, Switzerland

[73] Assignee: Ebnöther AG Sempach Station, Sempach Station, Switzerland

[21] Appl. No.: 172,290

[22] Filed: Jul. 25, 1980

[30] Foreign Application Priority Data

Aug. 8, 1979 [CH] Switzerland ................ 7259/79

[51] Int. Cl.³ .................. C02F 1/72; C02C 5/04; E02B 13/00
[52] U.S. Cl. .................. 210/721; 206/0.5; 206/524.7; 210/758; 405/52; 119/5
[58] Field of Search .......... 206/0.5, 524.7, 525; 405/52; 119/5; 210/721, 758

[56] References Cited

U.S. PATENT DOCUMENTS

| | | | |
|---|---|---|---|
| 2,750,027 | 6/1956 | Cummings | 206/0.5 |
| 3,304,653 | 2/1967 | Zadarnowski | 119/5 |
| 3,320,926 | 5/1967 | Smith | 405/52 |
| 3,489,396 | 1/1970 | D'Aragon | 405/52 |
| 3,525,426 | 8/1970 | Miller | 206/0.5 |
| 3,542,524 | 11/1970 | Kimble et al. | 119/5 |
| 3,758,083 | 9/1973 | Palmer | 405/52 |

*Primary Examiner*—William T. Dixson, Jr.
*Attorney, Agent, or Firm*—Werner W. Kleeman

[57] ABSTRACT

In order to incorporate oxygen into waters there is immersed therein at least one container or vessel which contains liquid oxygen. The oxygen is released into the water. The container is formed at least in part of a water soluble material, so that there results automatic release of the oxygen. Hence, oxygen can be introduced into deeper situated layers of the water without otherwise impairing the waters. With this equipment and technique there is avoided the need for complicated installations and there are not issued any emissions.

7 Claims, 1 Drawing Figure

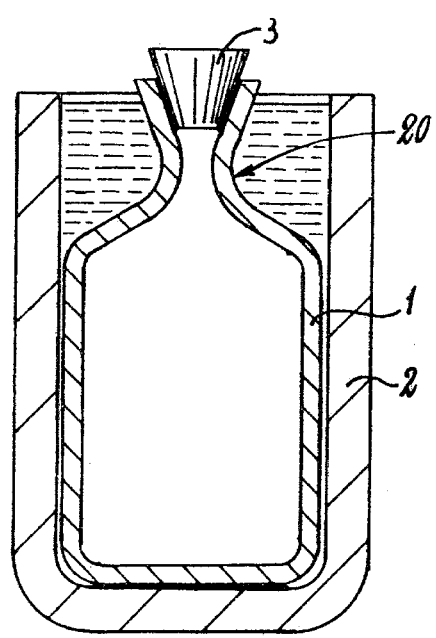

4,305,828

METHOD OF INTRODUCING OXYGEN INTO WATER AND CONTAINER FOR THE PERFORMANCE OF SUCH METHOD

BACKGROUND OF THE INVENTION

The present invention relates to a new and improved method of introducing oxygen into waters and to a container or vessel for the performance of such method.

With increasing chemical and bacteriological contamination of waters its content of dissolved oxygen decreases. This ultimately leads to imbalance of the equilibrium conditions between contamination and natural purification, so that the waters tend to so-to-speak "suffocate".

Due to excessive fertilization of the waters, for instance with chemicals such as phosphates, there is intensively promoted the growth of vegetation. The dying and decaying of such vegetation, on the other hand, leads to an increased oxygen consumption, until finally, particularly at the lower regions of the water, there is practically no longer available any oxygen.

During the summer months there thus occurs the so-called summer stagnation of the waters which continues up until the fall season and leads to the undesirable result that no natural water circulation takes place in such waters. There occurs a stratification or layering of the water. At the top of the body of water there is formed a relatively warm water layer of, for instance, a temperature above 15° C. which extends over a height of about ten meters. This topmost layer of water still contains an adequate oxygen content. It is referred to commonly as the epilimnion. Below the epilimnion there is a layer of water which is referred to as the thermocline, which has a depth of between about ten meters to almost approximately seventeen meters. Within the thermocline the temperature of the water decreases from the upper region of such water layer towards the bottom region thereof until reaching a temperature of about 4° C., and equally, the oxygen content is intensively reduced. Below the thermocline there is finally located a water layer which extends almost up to the bottom of the body of water, this water layer being referred as the hypolimnion. In the hypolimnion the temperature and the oxygen content which is too low is basically maintained, although slightly decreasing, even up to greater depths of such water layer up to almost forty meters. However, thereafter the oxygen content decreases suddenly, almost without any transition, up to null.

Thus it is particularly these deep water zones or regions where the dying and rotting vegetation particularly require to a great extent the oxygen, in order to render possible the natural purification or cleaning process of the waters.

Therefore, it has already been proposed to aerate these deeper situated water zones or regions in that water is upwardly conveyed from the base of the body of water, aerated and at the top of the body of water again allowed to flow-out. Yet, this aeration process causes upward conveying of the nutrients. Hence, the growth of the vegetation is promoted, which, in turn, leads to an increase in the dying-off products, so that finally oxygen is again consumed.

In order to reduce this effect, it has already been proposed that the upwardly conveyed ground water, following aeration, be returned below the thermocline, back into the upper regions of the hypolimnion. But this technique causes a certain disturbance in the stratification equilibrium or layering of the waters.

The circulation installations of both of the aforementioned processes are associated with considerable investment costs, are not particularly attractive in appearance and thus impair the landscape and also produce emissions in the form of noise and noxious odours. Even with the slightest amount of success such techniques require a great deal of energy.

SUMMARY OF THE INVENTION

Hence, with the foregoing in mind it is a primary object of the present invention to provide a new and improved method of, and apparatus for, introducing oxygen into waters in a manner not associated with the aforementioned drawbacks and limitations of the prior art proposals.

Another and more specific object of the present invention aims at overcoming these and still other disadvantages of the heretofore known water aeration techniques and equipment.

Yet a further significant object of the present invention aims at providing a new and improved method of, and apparatus for, introducing oxygen into waters wherein the amount of energy needed is relatively modest, there is required very little equipment, and furthermore, there is extensively avoided the issuance of emissions and environmental disturbances.

Another significant object of the present invention is directed to a method of, and apparatus for, introducing oxygen into waters in a manner satisfying the oxygen needs of such waters while also extensively avoiding disturbance to the layering or stratification of the waters.

Now in order to implement these and still further objects of the invention, which will become more readily apparent as the description proceeds, the method of the present development for the introduction of oxygen into waters is manifested by the features that at least one container which contains therein liquid oxygen is immersed into the waters and oxygen is released from the immersed container.

As to the apparatus for the performance of the method there is contemplated a container which contains the liquid oxygen, this container can be immersed into the water and the oxygen within the container is then released into the water. Preferably, the container is formed at least partially of a water soluble material.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE shows in sectional view a container structure according to the invention and useful for the practice of the method aspects.

DETAILED DESCRIPTION OF THE PREFERRED EMBODIMENTS

Describing now the invention in detail, in the single FIGURE there is purely schematically illustrated a flask or container 1 arranged within an insulating jacket 2 from which the flask or container 1 can be removed. This flask or container 1 is filled with liquid oxygen or liquid air. As soon as the flask 1 is heated-up then the loosely mounted plug 3 can be at least partially lifted so that there is not present any excess pressure.

The flask or container 1 advantageously consists of a suitable inorganic material, such as glass, clay or the like. If there is used porous clay as the flask or container material, then it can be sealed by means of water-soluble sodium silicate or water glass, which dissolves in water and frees the pores.

Only the container or flask 1, in other words not the insulating sleeve or jacket 2, is introduced into the waters. By virtue of the nozzle configuration of the container or flask neck 20 there can beneficially arise a certain acceleration of the container or flask 1 downwardly within the water when the oxygen-containing liquid gas expands. This reaction effect serves to downwardly propel the container 1 towards the base or bottom of the waters.

In practicing the invention it is possible to proceed such that the easy to handle containers or flasks 1 are thrown into the water manually from a boat for instance and these containers 1 are permitted to sink in the water. The release of the oxygen can be accomplished from the surface of the water, for instance by attaching a chord or the like to the closure plug 3 or by using a rupturable membrane which then fractures when sufficient pressure builds-up within the container 1. It is extremely advantageous if the release of the oxygen within the container 1 is accomplished by employing a water-soluble closure means, for instance by constructing the closure plug 3 of a material which is soluble in water, and which then only slowly dissolves because the temperatures encountered by the container 1 are quite low. The oxygen is then only released after the container 1 has reached the base of the waters.

The container or flask 1 however also can be accelerated into the depth of the water by employing a reaction-type gas drive, this drive likewise being activated by a water-soluble closure means when the container has sufficiently sunk in depth, so as not to disturb the top layers of the water by the action of the drive. The drive can be constructed in a rocket-like fashion, as the same is known from the technology of torpedo and rocket constructions.

If it is not desired to particularly reuse the container or flask 1, then the entire container structure can be formed of a water soluble material or a material which decomposes in water. Suitable water soluble materials are by way of example and not limitation: polyvinylalcohol, polyvinylpyrolidone, cellulose derivatives, casein, gelatin, alginates, polyacrylic acids and the like. There also can be used certain salts.

The containers also can have an insulating effect if there is desired a certain slow release of the oxygen. As the container fill there can be used, apart from the more or less pure liquid oxygen, of course also liquid air or another gas which can be converted into a suitable state.

The container or flask 1 additionally can contain other water treating agents, such as for instance iron ions and phosphate binders.

The construction of the container and its fill or filling material can be accommodated to the waters over wide limits. The data which is normally ascertained by analysing the water serves as an adequate basis for this purpose.

With the invention it is possible to realize, among other things, at least the following notable advantages:

There are not required any expensive installations, since the containers can be manually dropped into the waters or with the help of lifting devices from the shore, from piers or bridges or simply from boats or other marine vessels.

Hence, there are not needed any equipment or installations which encumber the surroundings and thus do not cause any damage to the environment.

Accordingly, the use of the equipment is not limited to any given locality or site, i.e. the method can be practically used at all locations and without any delay.

The local application of the method is possible in the manner explained and the degree of application thereof can be easily controlled or interrupted, as the situation requires or as desired.

There can be realized an extremely high efficiency.

The stratification or layering of the waters remains practically undisturbed.

The layer temperatures are not undesirably impaired.

As a practical matter there are not produced any emissions.

The costs are hardly greater than the operating costs of conventional installations, but devoid of their investment costs and expenditure.

The oxygen consumption is relatively low.

At this point there will now be described the method in greater detail based upon the following example:

EXAMPLE

There is to be provided with oxygen, in accordance with the invention, a non-flowing or stagnant body of water containing a total volume of about $160 \cdot 10^6$ m$^3$ and a hypolimnion of approximately $120 \cdot 10^6$ m$^3$ (approximately 75% of the total volume).

The following starting conditions prevail in the hypolimnion: the oxygen content at the start of stagnation amounts to approximately 7 mg/liter. Within about sixty days this oxygen content is reduced to about 1 mg/liter, so that there prevails an oxygen deficit of 6 mg/liter. This corresponds to a deficit of 100 mg/m$^3$/day.

In order to cover this deficit, there is required a daily oxygen addition of 100 mg/m$^3 \cdot 120 \cdot 10^6$ m$^3$ = 12000 kg.

With the heretofore known aeration methods there were required for this purpose, apart from the air lines, approximately twentyfour aerators and six compressors.

If there is employed, according to the invention, liquid oxygen, then there must be sunk in the water, for instance, for each day 240 flasks each containing 50 kg oxygen. The sinking of the containers or flasks can be accomplished in an extremely controlled and positive manner. It can be exactly accommodated to the momentarily encountered conditions, such as water contamination, depth and so forth.

Furthermore, in accordance with the invention, in contrast to the heretofore known prior art techniques, it is possible to briefly vary the employed quantities of oxygen and the site where the same is applied. Hence, it is possible to take into account the time of day, time of year, the effect, water temperature, oxygen requirement, biogenic oxygen production and many other factors. This allows optimizing the incorporation of the oxygen or oxygen-containing air or other suitable gas into the waters and therefore its degree of effectiveness.

While there are shown and described present preferred embodiments of the invention, it is to be distinctly understood that the invention is not limited thereto, but may be otherwise variously embodied and practiced within the scope of the following claims. Accordingly,

What I claim is:

1. A method of introducing oxygen into waters, comprising the steps of:

immersing at least one container which contains a gas-containing oxygen into the waters; and releasing the gas-containing oxygen from the immersed container.

2. The method as defined in claim 1, further including the steps of:

utilizing as the gas-containing oxygen liquid oxygen.

3. The method as defined in claim 1, further including the steps of:

utilizing as the gas-containing oxygen liquid air.

4. The method as defined in claim 1, further including the steps of:

releasing apart from the gas-containing oxygen at least one other water treatment agent into the water from the immersed container.

5. The method as defined in claim 4, wherein:

said released water treatment agent is a phosphate binder.

6. The method as defined in claim 1, further including the steps of:

utilizing as the container a container which is at least partially formed of a water-soluble material.

7. The method as defined in claim 1, further including the steps of:

accelerating downwardly into the water the container by the reaction of the gas-containing oxygen which is released therefrom.

* * * * *